M. SEGRE.
MANUFACTURE OF HOLLOW ARTICLES FROM HORN.
APPLICATION FILED APR. 11, 1919.

1,333,188.

Patented Mar. 9, 1920.

Inventor
Mario Segre by Laurence Langner
Attorney

UNITED STATES PATENT OFFICE.

MARIO SEGRE, OF VERCELLI, ITALY.

MANUFACTURE OF HOLLOW ARTICLES FROM HORN.

1,333,188.   Specification of Letters Patent.   Patented Mar. 9, 1920.

Application filed April 11, 1919. Serial No. 289,420.

*To all whom it may concern:*

Be it known that I, MARIO SEGRE, subject of the King of Italy, and resident of Vercelli, in the district of Piedmont, Italy, have invented certain new and useful Improvements in the Manufacture of Hollow Articles from Horn, of which the following is a specification.

This invention has for its object the provision of an improved process for the manufacture of hollow or partly hollow articles of all kinds, more particularly of bell shape, such as for example electric insulators, by utilizing a material which at present is not utilized in the manufacture of horn articles.

This invention affords the two-fold advantage of considerably reducing the amount of horn that would otherwise remain unused, and of producing by a simple process hollow articles of bell shape from a material that possesses very good technical properties, among others those of providing a good insulation for electricity.

Figure 1:
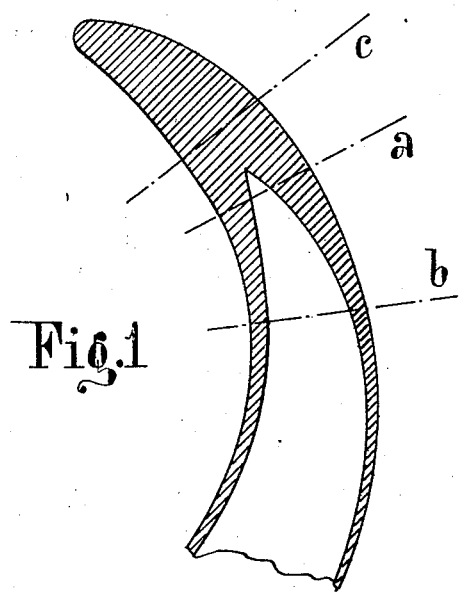
Figure 1 is a longitudinal section of a horn of an ox.

As shown in Fig. 1, the horn comprises a solid portion and a hollow portion, which according to the usual methods heretofore employed, is cut transversely approximately along the lines $a$ and $b$ for the purpose of utilizing the solid portion of the point and the thin-walled body portion which is then split longitudinally and flattened out.

The intermediate portion of irregular thickness has remained heretofore unused and wasted.

According to the present invention the horn is cut along the lines $b$ and $c$, and the intermediate portion which comprises a portion of the solid point, is subjected to a hot stamping operation which imparts to it the shape of the article to be manufactured. This cutting of the point at $c$ instead of at $a$ does not appreciably reduce the commercial value of the point portion.

Figure 3:
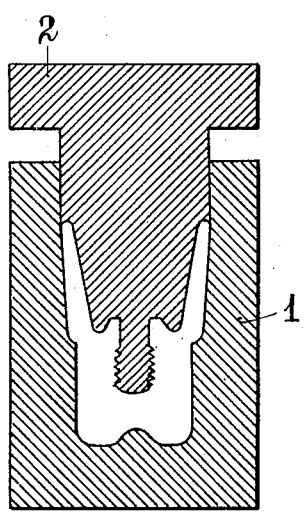
Fig. 3 is a diagrammatic axial section of a mold adapted to be employed for the manufacture of the bell-shaped insulator shown in Fig. 2.
Figure 2:
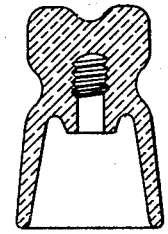
Fig. 2 is an axial section of a bell-shaped electric insulator produced according to this invention.

When it is desired to manufacture, for instance the bell-shaped insulator illustrated in Fig. 2, it is sufficient to place the said intermediate portion of the horn into a mold, such as that shown in Fig. 3 which consists of a matrix 1 and a die 2, and to exert a strong pressure under heat according to the methods usually adopted for the manufacture of articles of horn. In all cases the said intermediate portion of the horn will assume the shape of the matrix and can be subjected in succession to the usual finishing operations on a lathe, for instance for forming the annular groove which is provided on the insulator.

This groove may also be formed simultaneously in the stamping operation by using a matrix composed of a plurality of parts according to the known methods.

The article may be provided externally and also internally with screw-threads during the stamping operation by providing a corresponding portion of the matrix or of the die with a negative screw-threading into which the horny material is forced by pressure, as more fully described in my Patent No. 1,227,680, dated May 29th, 1917.

If the said intermediate portion of the horn is not sufficient of itself to form the desired article, it is merely necessary to introduce into the mold, together with the said intermediate portion, cuttings of horny substance (horn or hoof) which will become firmly agglomerated with the rest of the horn and will produce together with the latter an article of great strength.

In any case, both by reason of the nature of the horny material and also as the result of the compression which it undergoes during the stamping operation, which imparts to it a great compactness, the present invention is capable of producing articles of bell shape of great strength capable of numerous uses, including electrical purposes owing to the good insulating properties which horny material possesses, especially after having undergone compression in the mold.

What I claim as my invention and desire to secure by United States Letters Patent is:

1. The method of manufacturing hollow articles, which consists in cutting from the horn of an animal the intermediate portion thereof which includes part of the thin-walled body and part of solid point, and shaping said intermediate portion in a mold by the application of heat and pressure.

2. The method of manufacturing bell-shaped electric insulators, which consists in cutting from the horn of an animal the intermediate portion thereof which includes part of the thin-walled body and part of the solid point, and shaping said intermediate portion in a mold by the application of heat and pressure.

3. As a new article of manufacture, a hollow article made from the intermediate portion of the horn of an animal, comprising part of the thin-walled body of the horn and part of the solid point said intermediate portion being stamped in heat in a mold.

4. As a new article of manufacture, a bell-shaped electric insulation made from the intermediate portion of the horn of an animal, comprising part of the thin-walled body of the horn and part of the solid point said intermediate portion being stamped in heat in a mold.

Signed at Turin, Italy, this 19th day of March, A. D. 1919.

MARIO SEGRE.